Dec. 12, 1939.  S. G. BOND  2,183,089
TIRE PRESSURE SIGNAL
Filed March 7, 1938  2 Sheets-Sheet 1
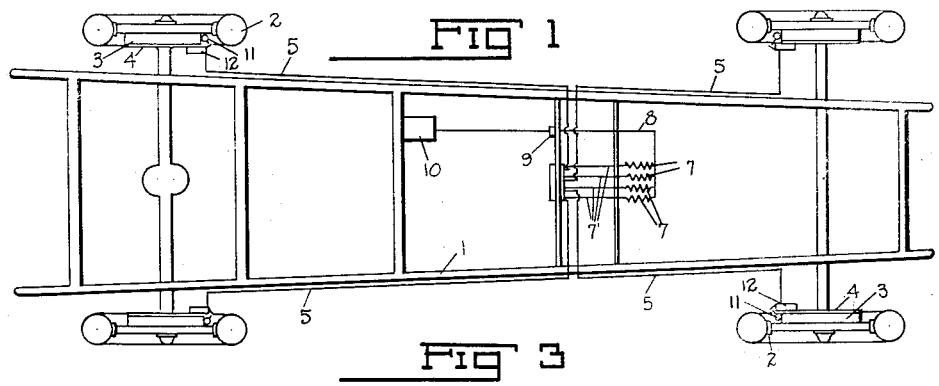
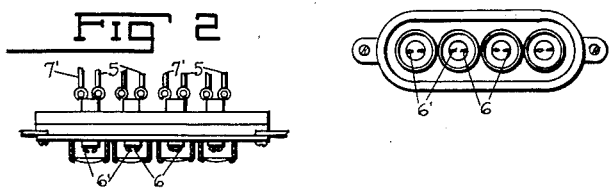
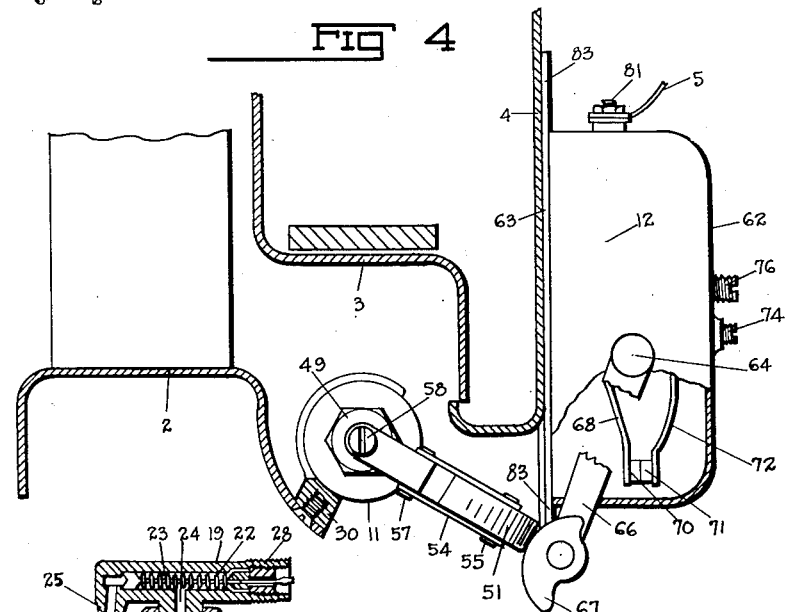
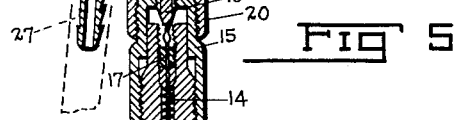
INVENTOR.
SHERMAN G. BOND
BY
Charles R Werner
ATTORNEY.

Dec. 12, 1939.     S. G. BOND     2,183,089
TIRE PRESSURE SIGNAL
Filed March 7, 1938      2 Sheets-Sheet 2
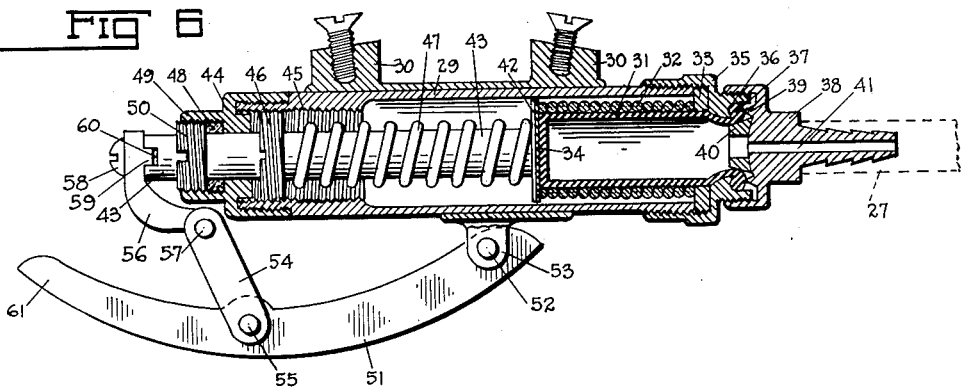
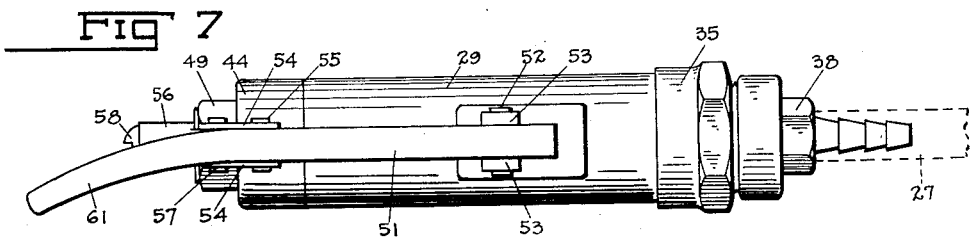
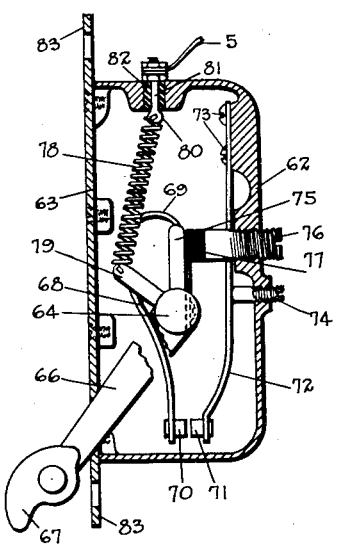
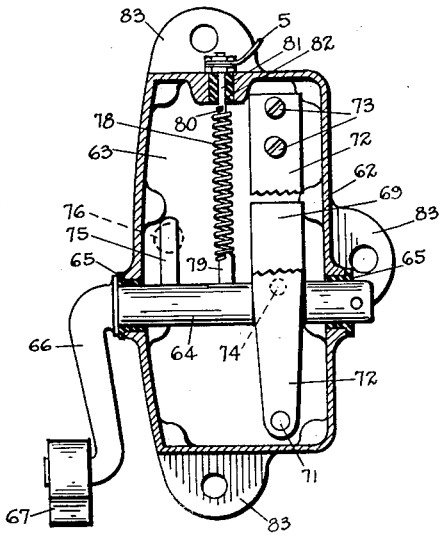
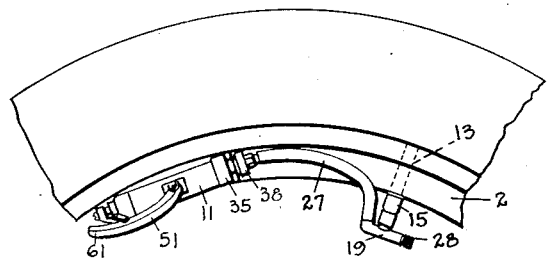
INVENTOR.
SHERMAN G. BOND
BY Charles R. Werner
ATTORNEY.

Patented Dec. 12, 1939

2,183,089

UNITED STATES PATENT OFFICE 2,183,089

TIRE PRESSURE SIGNAL

Sherman G. Bond, Wichita, Kans.

Application March 7, 1938, Serial No. 194,286

4 Claims. (Cl. 200—58)

This invention relates in general to tire pressure signals and particularly to that class of device in which means are employed in connection with each tire for indicating a decrease from normal pressure in said tires, the indicator being in visual relation to the operator of the vehicle.

This invention contemplates improvements over the device shown in my Patent No. 1,773,215, entitled "Tire indicator switch," granted August 19, 1930.

The primary object of the invention is to provide an actuator rotatable with the tire and responsive to changes of pressure within said tire, a circuit closing device in close proximity to the circular path of the actuator and adapted to be intermittently actuated by an element on said actuator when the pressure in the tire decreases a predetermined amount.

Second; to provide a signalling circuit including spark coils and a visual indicator comprising spark gaps for each tire, the momentary closing of the circuit causing a spark to jump the gap and indicating to the vehicle operator that a tire is losing pressure. The circuit includes the storage battery of the vehicle or an auxiliary source of current for the spark coils, the conductor from the battery passing through the ignition switch whereby the tire signal will operate only when the ignition switch is on, eliminating the possibility of running down the battery if one of the actuators should be stopped in alignment with the circuit closing device. A separate circuit including a spark coil, signal, actuator and circuit maker is provided for each tire, whether on a standard passenger car or truck with one tire on each wheel, or on other vehicles using dual wheels and tires, the operator being enabled to tell instantly exactly which tire is losing air.

Third; to provide an improved construction in the actuator making it extremely sensitive and less susceptible to damage and deterioration by the weather and elements.

Fourth; to provide an improved construction in the circuit closing device whereby more sensitive adjustments may be made and smoother operation effected.

In perfecting a successful device of this nature it has been found that two essential features or characteristics are required. These are, first, an actuator or pressure responsive member which is adjustable and sensitive to high degree, that is, within a pound or two of the desired tire pressure, whereby the device will operate a signal when the pressure in any tire has dropped from 1 to 5 pounds below the required pressure. This is the preferred range but the adjustment can be set so as to operate at any desired pressure below normal. The adjustable feature makes it possible to use the same actuator with equal efficiency on heavy duty tires requiring 100 pounds or more pressure or on low pressure balloons of 20 to 30 pounds pressure.

In carrying out this first feature of my device I have so designed it that there will be little or no friction on the moving parts actuated by the air pressure since any friction will retard the free movement of the mechanism.

The second feature which must be inherent in a successful operating device of this nature is a positive acting signal. Since the contact between the actuator and the circuit closer is intermittent and momentary, an instantaneously actuable signal or alarm system must be provided. It has been found that incandescent bulbs, bells, buzzers and the like will not operate successfully due to the lag in the circuit caused by the resistance thereof and the too-short period of contact in the circuit closing device. However, in a circuit employing spark coils and a spark gap, the response to the brief closing of the circuit is instantaneous and a spark will jump the gap every time the circuit is closed, making a positive and very noticeable alarm or signal for the operator.

The actuator is in permanent communication with the inner tube of the tire so that the pressure is equalized and any changes in pressure in the tube instantly cause an equal change of pressure in the actuator.

Further objects and advantages of my invention, as well as its construction and operation will be readily apparent by reference to the following specification in connection with the accompanying drawings in which:

Fig. 1 is a semi-diagrammatic top view of a vehicle chassis showing the arrangement and circuit of the tire pressure signal comprising my invention.

Fig. 2 is a top view of the dash board signal assembly.

Fig. 3 is a front elevational view of the same.

Fig. 4 is a fragmentary, cross sectional view through a wheel and brake drum showing the actuator and the circuit closer in elevation with parts broken away to better illustrate certain other parts.

Fig. 5 is a detail cross sectional view through the composite valve stem showing the outlet to the actuator.

Fig. 6 is a detail longitudinal, sectional view through the actuator.

Fig. 7 is a longitudinal, elevational view of the same.

Fig. 8 is a detail cross sectional view through the circuit closing device.

Fig. 9 is an elevational view in detail of the interior of the circuit closing device with the cover broken away in section.

Fig. 10 is a fragmentary elevational view of a portion of a tire showing the actuator in communication with the inner tube through the composite valve stem.

Referring now to the drawings by numerals of reference 1 designates a vehicle chassis carrying wheels 2, brake drums 3 and brake mechanism covers 4, my invention being applied to these above-named parts.

The visual indicator system includes conductors 5 running from each wheel to one of the spark points 6, each of the spark points 6' with the points 6, forming the spark gap, the points 6' being connected to spark coils 7 through conductors 7', a common conductor 8 connecting the other side of each spark coil and passing through switch 9 to the storage battery 10, the other side of which is grounded. The switch 9 is preferably the ignition switch so that the signal device will operate only when the ignition switch is turned on. The circuit closing mechanism will be described more in detail hereinafter. The spark points comprising the visual indicator assembly may be suitably mounted on the instrument panel of the vehicle or on the steering column in visual relation to the operator of the vehicle.

In Fig. 4 is shown a fragmentary view of the wheel 2, brake drum 3 and brake cover 4, the actuator 11 being secured to the wheel and the circuit closing device 12 being secured to the brake cover 4 in a suitable position so as to be in actuable relation to the actuator. The device as shown in Fig. 4 indicates that the circuit is closed.

In employing my device on vehicles it is necessary to provide means for interconnecting the inner tube with the actuator 11 and toward that end I have provided in connection with the valve stem 13 having valve core 14, a valve opening member 15 threadedly engaging said stem and having a valve engaging finger 16 adapted to contact the valve pin 17 and force same down to open the valve. The finger 16 is adjustably threaded into the member 15 and has passages 18 therein through which the air may pass when the valve is open.

A T-head 19 is secured to the member 15 by means of the coupling member 20 threaded on member 15, packing 21 forming an air tight connection. A valve core 22 is positioned in T-head 19 and valves the passage 23 in communication with passage 24 leading to passages 18 in valve engaging finger 16. An offset extension 25 has passage 26 opening into passage 24, said offset suitably carrying flexible hose connection 27 to actuator 11.

Air to the inner tube is applied at the end 28 of the T-head 19 and it is evident that the valve 22 is sufficient to valve the tube and the valve core 14 may be removed. However in assembling my tire pressure signal it may be desired to apply it directly on the existing valve stems without removing the cores and for that reason I have provided the engaging finger 16 which retains the valve core 14 in open position.

The actuator 11 comprises an elongated body member or housing 29 having attachment lugs 30 for securing the actuator to the wheel. Positioned in one end of the body member 29 is a pressure responsive member or resilient sac 31 encircled by a highly resilient coil spring 32 having head flange 33 and plate 34 secured thereto. The head flange 33 is threadedly secured in cap 35 which in turn is threadedly engaged on housing 29. The cap 35 carries a seat 36 in which integral ring or collar 37 of sac 31 may rest. A nozzle cap 38 is in threaded connection with cap 35 and has an annular V offset 39 which engages and forms an air tight connection with the collar 37, a washer 40 forced against the inside of the collar 37 by the cap 38 also assisting in forming an airtight connection. A passage 41 is provided through the nozzle cap 38 and the washer 40 connecting with the interior of the resilient sac 31. The hose connection 27 is suitably secured to the nozzle cap 38, the other end of the hose connecting with the extension 25 on the T-head 19.

Adapted to abut the plate 34 is the plunger head 42 secured to the end of the plunger or stem 43 sleeved in bearing cap 44 in threaded engagement with the housing 29. An interior thread 45 is provided in the housing and an adjustment ring 46 is carried by said thread 45 and bears against the compression spring 47 which encircles the plunger 43, the other end of the spring 47 bearing against the plunger head 42, the plunger moving freely in the adjustment ring 46. Packing 48 surrounds the plunger 43 where it passes through extension 49 of bearing cap 44, a packing plug 50 being threadedly engaged in the extension 49 and adapted to be tightened against the packing.

A contact arm 51, preferably of a non-conducting material and curved as shown, is pivoted at 52 to extending lugs 53. Links 54 are pivoted to the arm 51 at 55 and to plunger arm 56 at 57, plunger arm 56 being secured to the plunger 43 by screw 58 or any other suitable means, the rib 59 of arm 56 being positioned in the slot 60 of the plunger 43, preventing turning of the plunger.

As shown in Fig. 7 the "tail" 61 of the contact arm 51 may be curved to approximately follow the circular path of the actuator 11 as it rotates with the wheel.

From the foregoing detailed specification of the actuator it will be seen that the resilient sac 31 forms an elongatable air chamber in direct communication with the interior of the inner tube through the hose connection 27. The moving parts are constructed and arranged to provide extreme freedom of movement and with maximum protection against rain, dust and other foreign elements.

Turning the adjustment ring 46 to compress or elongate the spring 47 will change the setting of the device, that is, the position of the ring 46 and the amount of compression on the spring will determine the point at which the loss of air pressure in the tire will cause movement in the actuator.

The circuit closing device 12 shown in Figs. 4, 8 and 9 comprises a casing 62 and cover and mounting plate 63 suitably secured thereto. A transverse rock shaft 64 passes through insulator bearings 65 in the casing and has an outside rocker arm 66 carrying a pivoted segment 67 preferably of a non-conductive material and adapted to be contacted by the contact arm 51 of the actuator 11.

A resilient arm 68 is secured to the rock shaft 64 and has a loop 69 for greater resiliency, the free end of arm 68 carrying contact point 70 adapted to engage the contact point 71 on resilient arm 72 secured to casing 62 at 73. An adjustment screw 74 threaded in casing 62 bears against the arm 72 and provides for adjustment of the point 71 carried thereby.

The rock shaft carries a pin 75 adapted to be engaged by adjusting screw 76, the end of which carries an insulated segment 77 to prevent grounding of the rock shaft, adjusting screw 76 also being used for setting the gap between the points 70 and 71.

The points are kept separated by means of coil spring 78, one end of which is secured to the spring pin 79 on rock shaft 64, the other end of the spring being carried by loop 80 of terminal 81 passing through insulator 82 in casing 62, the conductor 5 being connected to the terminal 81.

The ears or lugs 83 on mounting plate 63 provide for attachment of the circuit closing device to the brake mechanism cover plate 4 or to any other suitable support, it being kept in mind that the segment 67 must be positioned in the path of the contact arm 51 of the actuator 11 when the arm is moved by decrease of pressure in the tire.

It will be seen from the preceding specifications that the contact point 70 is insulated from the ground side of the circuit and when the contacts are closed the circuit is made through the casing 62 to ground, and since one side of the battery is grounded the current will pass through the proper coil 7 and cause a spark to jump the gap formed by points 6 and 6'.

With the actuators 11 properly secured to each wheel and the circuit closing devices 12 suitably mounted to each brake cover 4, and T cap assemblies on each valve stem 13, the air hose connection 27 is fastened to the nozzle cap 38 and the offset extension 25 of the T-head 19.

The proper amount of air is pumped into each tire, the pressure equalizing itself throughout the inner tube and the actuator, the pressure responsive member or resilient sac 31 within the coil spring jacket 32 elongating to force plunger 43 outwardly and causing the curved contact arm 51 to move toward the actuator housing 29, where said arm 51 will clear the segment 67 on the rocker arm 66. As long as the pressure in the tire and in the sac 31 remains constant and above a predetermined amount, the contact arm 51 will retain its position. However, if a leak occurs and air is lost, the sac 31 will contract or shorten, causing outward movement of the contact arm 51 moving it into intermittent engagement with the segment 67 to move the points 70 and 71 into circuit closing engagement with each other, causing a spark to jump the gap in the visual signal corresponding to the tire which is losing air, the operator of the vehicle being instantly apprised of the fact that the tire is deficient in air pressure.

Adjustment of the ring 46 in the actuator will change the compression on the spring 47 to allow the sac 31 to react at a predetermined air pressure. The spacing of the points 70 and 71 and the relation between the segment 67 and the contact arm 51 may be adjusted for most suitable operation.

From the foregoing it will be apparent that I have provided an efficiently and positive operating tire pressure signal including visual indicator means whereby the vehicle operator may be instantly apprised of a low tire.

Past records show that countless numbers of accidents have occurred due to low tires blowing out. Life of tires are greatly shortened when they are underinflated. In trucks and busses having dual wheels, it is often true that pressure is lost in one of the tires, throwing a great overload on the other tire. This has caused blowouts with attendant disastrous and ofttimes tragic results. By use of my device, however, the fact that the air pressure is low will be immediately conveyed to the operator who can take the necessary precautions until repairs are made or the pressure brought up to normal.

It is obvious that changes in form, proportion and details of construction may be resorted to without departing from the spirit of my invention and I therefore reserve all rights to such changes as come within the scope of these specifications and the following claims.

What I claim as new and desire to secure by Letters Patent is:

1. In a device of the class described, an elongated casing, a pressure responsive element in the casing, a plunger movable by the pressure responsive element and slidably extending through and sealed with respect to one end of the casing, a contact arm pivotally carried at one end by the casing, said plunger being pivotally connected to said contact arm to cause movement thereof with respect to the longitudinal axis of the casing.

2. In a device of the class described, an elongated casing, a pressure responsive element in the casing, a plunger movable by the pressure responsive element and slidably extending through and sealed with respect to one end of the casing, a contact arm pivotally carried at one end by the casing, a link pivoted to the plunger and to the contact arm to cause movement of said contact arm toward and away from the longitudinal axis of the casing upon endwise movement of the plunger.

3. In a device of the class described, an elongated casing, a pressure responsive element in the casing, a plunger movable by the pressure responsive element and slidably extending through and sealed with respect to one end of the casing, a contact arm pivotally carried at one end by the casing, an arm carried by the plunger, a link pivoted to the plunger arm and to the contact arm to cause movement of said contact arm toward and away from the longitudinal axis of the casing upon endwise movement of the plunger.

4. In a device of the class described, an elongated casing, a pressure responsive element in the casing, a plunger movable by the pressure responsive element and slidably extending through and sealed with respect to one end of the casing, a contact arm pivotally carried at one end of the casing, said plunger being pivotally connected to said contact arm to cause movement thereof with respect to the longitudinal axis of the casing, said pressure responsive element including a rubber sac, a peripheral flange on one end of said sac, a seat for said flange, a nozzle tip carried by the casing, and a V-shaped sealing flange carried by said tip and adapted to engage the flange on said sac to force said flange into sealing engagement with the seat.

SHERMAN G. BOND.